Patented Dec. 17, 1929

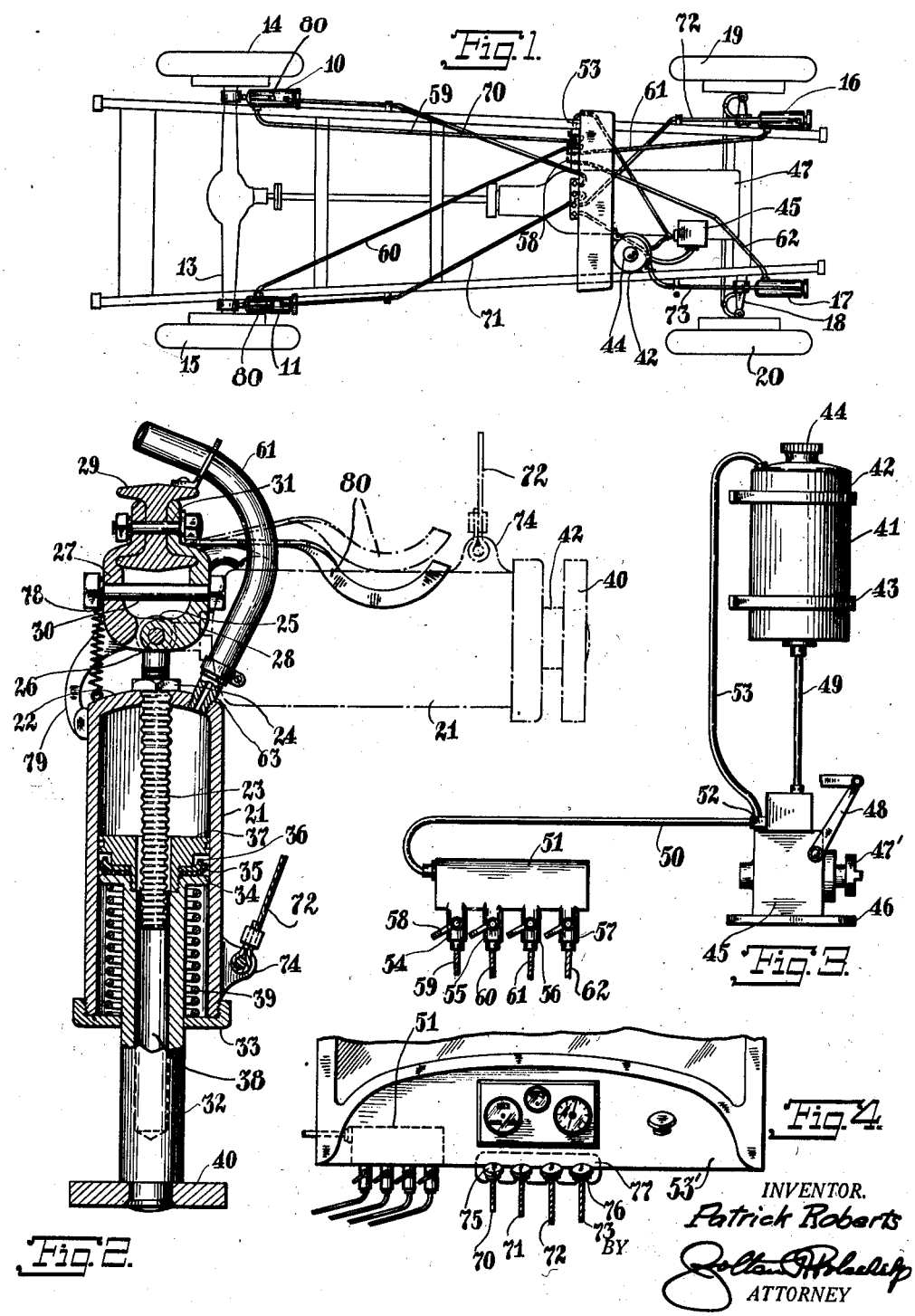

1,740,268

UNITED STATES PATENT OFFICE

PATRICK ROBERTS, OF NEW YORK, N. Y.

VEHICLE JACK

Application filed March 26, 1928. Serial No. 264,688.

This invention is an improved fluid pressure operated jack especially adapted for raising or lowering a motor vehicle. The object of the invention is to provide an improved jack of simple construction and which is automatic in operation.

With the above and other objects in view, the invention consists in the construction, combination and arrangement hereinafter described, claimed and illustrated.

Fig. 1 is a plan view of a motor vehicle chassis equipped with my improved device.

Fig. 2 is an enlarged vertical central sectional view of my improved jack illustrating same attached to the front axle of a motor vehicle.

Fig. 3 is a side elevational view of the supply tank, pump and distributor header as embodied in my improved device.

Fig. 4 is a front elevational view of the cowl board of a motor vehicle showing in particular the distributor header and jack control buttons as embodied in my improved device, attached thereto.

As here embodied my improved device comprises a pair of jacks 10 and 11 secured, as hereinafter set forth to the rear axle 13 of a motor vehicle preferably adjacent to the rear wheels 14 and 15, respectively, and a pair of similar jacks 16 and 17 similarly secured to the front axle of the motor vehicle, preferably adjacent to the front wheels 19 and 20, respectively.

The above mentioned jacks 10, 11, 16 and 17 are of similar or identical construction and consist of a shell 21 of tubular construction having a closed upper end 22. A threaded rod 23 is threadedly mounted in an axial opening formed in the closed end 22 of the shell 21, and has adjustably secured thereto a threaded member 24 preferably a nut, as a means of holding the shell in any desired position on the rod 23, for the purpose as hereinafter set forth.

The rod 23 is provided with an enlarged extremity 25 having formed therein an aperture adapted to receive a pin 26 as a means of pivotally mounting my improved jack to a pair of clamp members 27 and 28, adapted to engage the front axle 29 or I beam of a motor vehicle, and secured thereto by the threaded member 31, preferably bolts, studs, screws or the like.

A plunger rod 32 is slidably mounted in an opening formed in a cap 33 threadedly secured to the lower extremity of the shell 21, and is provided with an upper enlarged portion 34 or extremity adapted to slidably engage in the shell 21. Suitable piston packing 35 and a retaining ring 36 are secured to the enlarged extremity 34 of the plunger rod 32 by means of a collar 37 threadedly secured to the enlarged extremity 34 of the plunger rod 32, and adapted to slidably engage in the shell 21. The latter described construction is such as will provide a suitable fluid tight plunger rod. The above mentioned elements 34, 35, 36, 37 and the plunger rod 32 have formed therein an axial opening 38 adapted to freely receive the lower extremity of the above mentioned rod 23.

An expansion spring 39 is positioned in the shell 21 intermediate the cap 33 and the enlarged extremity 34 of the plunger rod 32 as a means of normally holding the plunger rod 32 in a non-extended position relative to the shell 21. The plunger rod 32 has secured thereto at its lower extremity a support 40, or base, preferably of circular disc construction.

It is understood that suitable clamp members, not shown in the accompanying drawing, adapted to engage the rear axle 13 of the motor vehicle, are provided as a means of pivotally attaching the above mentioned jacks 10 and 11 to the rear axle.

A tank 41 adapted to hold a fluid preferably a mixture of glycerine and alcohol, not affected by changes in temperature, has affixed thereto suitable clamps 42 and 43 as a means of attaching the tank 41 to the dash or any suitable, convenient part of the motor vehicle. The tank 41 has removably secured thereto a cap 44, as a means of filling the said tank with the prescribed fluid.

A pump 45 of any conventional design and construction, preferably of the single cylinder type is provided with a base 46 as a means of mounting the pump on any suitable convenient portion of the engine 47 and is operatively connected by means of a suitable coupling 47' to the cam shaft, water pump or accessory shaft of the said engine. The pump 45 is provided with a lever 48 operatively connected to a clutch or any conventional mechanism, as a means of operatively connecting and disconnecting the pump 45 to the engine 47.

The above mentioned pump 45 is connected by means of a suitable tubular member 49 to the supply tank 41, and is connected by means of a tubular member 50 to the distributor header 51. The pump 45 is provided with the usual conventional relief valve 52 connected by the tubular member 53 to the tank 41.

The distributor 51 is secured to the cowl board 53' of the motor vehicle within easy and convenient reach of the operator of the motor vehicle. The header 51 is of hollow construction, and is provided with a plurality of outlets 54, 55, 56 and 57, provided with suitable shut off valves 58. The outlets 54, 55, 56 and 57 are connected by means of tubular members 59, 60, 61 and 62 respectively, to the nipples 63 secured to the shells of the jacks 10, 11, 16 and 17 respectively.

The above described construction is such as will permit the hereinbefore mentioned fluid placed in the supply tank to be pumped under pressure to any desired one of the jacks 10, 11, 16 and 17, when the shut off valves 58 are manually opened as a means of extending the plunger rods 32 which permit the supports 40 to raise any desired one of the wheels 14, 15, 19 and 20 of the motor vehicle as required to change a tire, reline a brake or for inspection purposes or the like.

Flexible members 70, 71, 72 and 73 are secured to lug elements 74 of the shells 21 of the jacks 10, 11, 16 and 17, respectively and have secured thereto at their extended extremities buttons 75, knobs or the like adapted to engage in suitable notches 76 formed in a support 77 secured to the cowl board 53 within easy, convenient reach of the operator of the motor vehicle.

The latter described construction is such as to normally hold the jacks 10, 11, 16 and 17 in approximately horizontal extended positions relative to the above mentioned front and rear axles of the motor vehicle. The jacks are restrained from vibrating while the vehicle travels by springs 80 arranged to normally urge the jacks downward against the upward holding action of the flexible members. The springs 80 are supported by the bolts 31.

Tension springs 78 are secured to the shells 21 of the said jacks 10, 11, 16 and 17 and are connected to any convenient suitable place or to the clamps 27 as a means of urging the jacks 10, 11, 16 and 17 into a vertical extended position downwardly from the front and rear axles of the motor vehicle when the said buttons 75 secured to the flexible members 70, 71, 72 and 73 are manually released from the notches 76 formed in the support 77. A limiting element 79 is extended downwardly from the clamp 27, and is adapted to be engaged by the shells 21 of the jacks 10, 11, 16 and 17 to limit the shells to vertical positions.

It is understood that the jacks are swung into vertical position prior to the extending of the plunger rods 32. It is also understood that the shells 21 are extended relative to the rods 23 as is desired to secure the proper lifting or raising of the wheels of the motor vehicle.

Pump 45 may be located near the dash board and operated manually by any suitable means in case it is not desired to connect the pump to the engine of the vehicle.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention what I claim as new and desire to secure by United States Letters Patent is:

1. In a fluid jack of the class described, a shell with a closed end, a plunger rod slidably mounted in the shell and having an enlarged inner end, and an axial opening extending from the said enlarged inner end to a small distance from the outer end, a rod for supporting the shell threadedly extended into the shell thru the said closed end for permitting an adjustment of the shell along its length, and engageable within the opening in the plunger to permit free motion of the plunger, and a nut threadedly engaged on the rod and abutting the closed end of the shell for holding the shell in adjusted positions on the rod.

2. In a fluid jack of the class described, a shell with a closed end, a plunger rod slidably mounted in the shell and having an enlarged inner end, and an axial opening extending from the said enlarged inner end to a small distance from the outer end, a rod for supporting the shell extended into the shell thru the said closed end and engageable within the opening in the plunger to permit free motion of the plunger, and means for holding the shell in fixed positions along the length of the rod.

3. In a fluid jack of the class described, a shell with a closed end, a plunger rod slidably mounted in the shell and having an enlarged inner end, and an axial opening extending from the said enlarged inner end to a small distance from the outer end, a rod threadedly extended into the shell thru the said closed end for permitting an adjustment of the shell along its length, and engageable within the opening in the plunger to permit free motion of the plunger, a nut threadedly engaged on the rod and abutting the closed end of the shell for holding the shell in adjusted positions on the rod, and clamps for attachment on a vehicle axle, pivotally secured on the outer end of the rod.

In testimony whereof I have affixed my signature.

PATRICK ROBERTS.